(12) United States Patent
Lewis-Cheeks

(10) Patent No.: US 9,761,114 B2
(45) Date of Patent: Sep. 12, 2017

(54) CAR SEAT CHILD-AWARE ALERT SYSTEM AND APPLICATION

(71) Applicant: Esther J. Lewis-Cheeks, Upper Marlboro, MD (US)

(72) Inventor: Esther J. Lewis-Cheeks, Upper Marlboro, MD (US)

( * ) Notice: Subject to any disclaimer, the term of this patent is extended or adjusted under 35 U.S.C. 154(b) by 0 days.

(21) Appl. No.: 14/827,029

(22) Filed: Aug. 14, 2015

(65) Prior Publication Data
US 2017/0043714 A1 Feb. 16, 2017

(51) Int. Cl.
| B60Q 1/00 | (2006.01) |
| G08B 21/24 | (2006.01) |
| B60N 2/00 | (2006.01) |
| G08B 21/22 | (2006.01) |

(52) U.S. Cl.
CPC ............ *G08B 21/24* (2013.01); *B60N 2/002* (2013.01); *G08B 21/22* (2013.01)

(58) Field of Classification Search
None
See application file for complete search history.

(56) References Cited

U.S. PATENT DOCUMENTS

| 9,014,920 | B1* | 4/2015 | Torres | G08B 21/0202 701/45 |
| 2006/0155430 | A1* | 7/2006 | Burgess | G06Q 10/087 701/1 |
| 2012/0075072 | A1* | 3/2012 | Pappu | H04B 5/0037 340/10.1 |
| 2012/0212335 | A1* | 8/2012 | Bahrami Ziarani | F16D 66/026 340/454 |
| 2013/0049955 | A1* | 2/2013 | Hoover | B60N 2/28 340/539.11 |
| 2016/0105762 | A1* | 4/2016 | Singh | H04L 51/38 455/41.2 |

* cited by examiner

*Primary Examiner* — Adolf Dsouza
(74) *Attorney, Agent, or Firm* — Michael L. Greenberg, Esq.; Greenberg & Lieberman, LLC

(57) ABSTRACT

A system and application to alert parents or guardians to the solitary status of a dependent accidentally left within the confines of a vehicle is described. The system alerts individuals in the event that a dependent such as a child is left behind via the use of sensors configured to detect the presence of the dependent, and determine if he or she is alone. Upon recognizing that the dependent has been left alone, an alert is sent to the parent or guardian's wirelessly connected key fob and/or mobile device via a proprietary mobile application. Simultaneously, the system employs an active display sticker, configured to calm or entertain the dependent left within the vehicle until the alerted parent or guardian returns.

10 Claims, 2 Drawing Sheets

CAR SEAT CHILD-AWARE ALERT SYSTEM AND APPLICATION

FIELD OF THE PRESENT INVENTION

The present invention relates generally to sensor-based alert systems, and more specifically, sensor-based alert systems configured to alert a parent or guardian in the event that a dependent is left unattended in a vehicle.

BACKGROUND OF THE PRESENT INVENTION

In the daily life of modern individuals, many people can become quickly overwhelmed with a multitude of tasks. Multi-tasking often leads people to become forgetful of the present, as well as the ongoing status of pertinent tasks at hand. In a rush to the store, or during an emergency, some people have even been known to accidentally leave behind animals or even children within the confines of their vehicle. Unfortunately, this can be more than an unfortunate accident, as on hot days, the interior of a vehicle can quickly become dangerous to living things. While this practice is illegal in many areas of the world, the unfortunate and preventable tragedy of a death still occurs several times a year. In cases where injury or death is not the result of the forgetful accident, the animal or especially child left behind in the vehicle is often left scared, depressed, or anxious until the return of the parent or guardian.

Thus, there is a need for an alert system equipped with sensors to detect the presence of a dependent individual within a specified location, such as within a child car seat or similar dependent seat. Such an alert system would preferably employ a proximity sensor and/or weight sensor that would accurately detect if a child was left alone in a vehicle after the vehicle was turned off, and after a specified period of time after the driver's door opens and closes. Such a system would prevent all injury cases, as the driver and/or guardian would be alerted, via a wirelessly connected key fob or a mobile application on a mobile device, to the abandonment of the dependent individual.

SUMMARY OF THE PRESENT INVENTION

The present invention is an alert system for the protection of dependent individuals left unattended accidentally within the confines of a vehicle. The system of the present invention employs sensors to detect the presence of a dependent within a specially fitted car seat, and is configured to alert the driver of the vehicle, such as the parent or guardian of the dependent, to the solitary status of the dependent, so that parent or guardian can return to the vehicle. The alert is preferably conveyed via a conventional wireless signal such as Bluetooth or similar technology, to a key fob and/or mobile device located on the guardian's person. The alert is envisioned to make the guardian aware of the situation, such that he or she may rapidly remedy it by returning to the vehicle to retrieve the dependent left within the vehicle by accident. The present invention employs a mobile device application configured to interface with the sensor system of the present invention, enabling the guardian to receive information from the sensor system of the present invention via the mobile application, including alerts about the status of the dependent, as well as if keys or another item are left behind in the vehicle.

The preferred embodiment of the present invention also preferably employs a wireless key-fob, configured to interface with the sensor system of the present invention, and provide alerts to the guardian, similar to the mobile phone application, in the event that the dependent is left unattended within a vehicle for a specified period of time. The present invention also preferably employs an interactive sticker or window apparatus configured to display lights and shapes, as well as play sounds within the vehicle in order to placate and minimize the anxiety of the dependent left unattended in the vehicle.

DETAILED DESCRIPTION OF THE PREFERRED EMBODIMENT

The present invention is a sensor and alert system configured to alert a parent or guardian in the event that the parent or guardian leaves a child or dependent unattended within a vehicle equipped with the system of the present invention. The present invention is designed to be installed within a vehicle, in communication with the electrical system of the vehicle. The present invention is equipped with sensors (10) configured to detect the presence of an individual within the confines of a vehicle, as well as detect if a dependent individual, such as a child, is sitting in a car seat (20) within the vehicle. The sensors (10) of the present invention preferably include a proximity sensor, light sensor, and weight sensor. Sensors (10) are also integrated into the electrical system of the vehicle, and are configured to make the system of the present invention aware of when the doors of the vehicle are open or closed.

Figure 1:
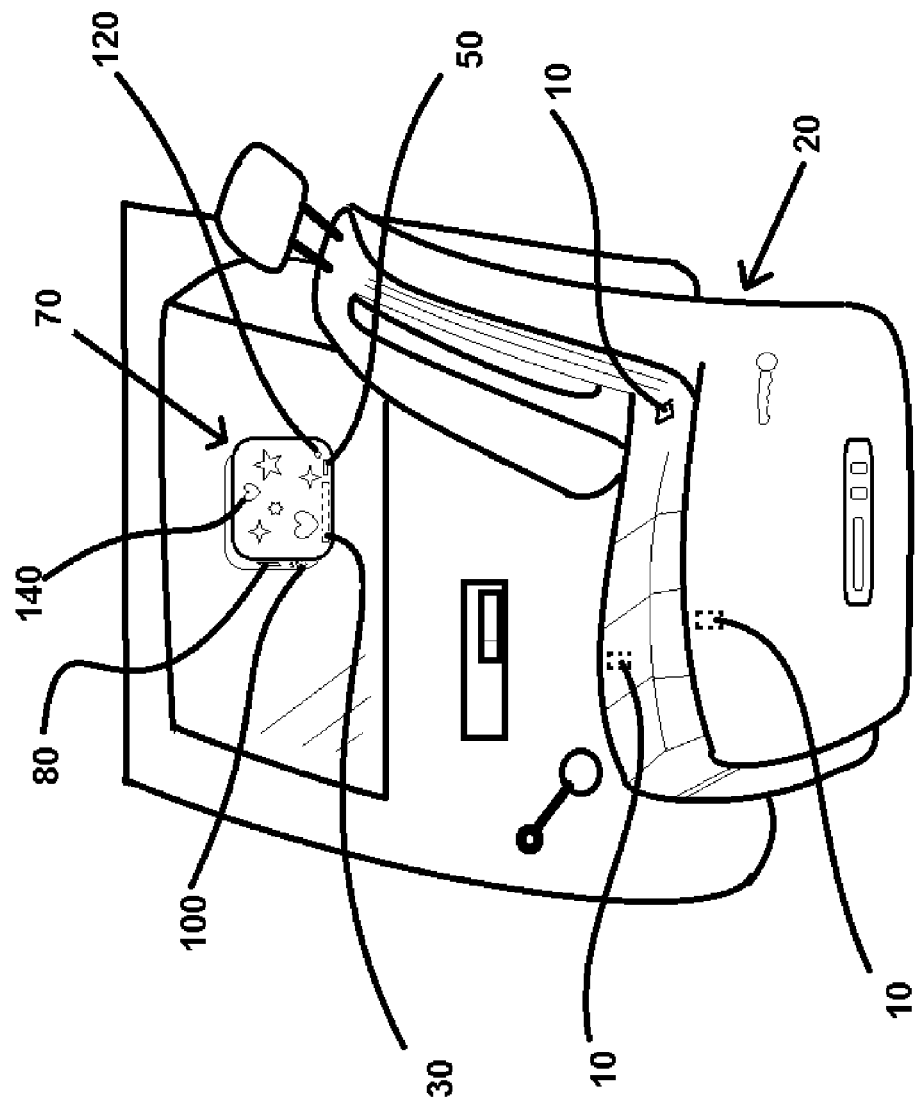
FIG. 1 shows an illustration of the car seat apparatus of the present invention equipped with sensors to detect the presence of an individual within the car seat. The accompanying sticker entertainment device is also shown.
Figure 3:
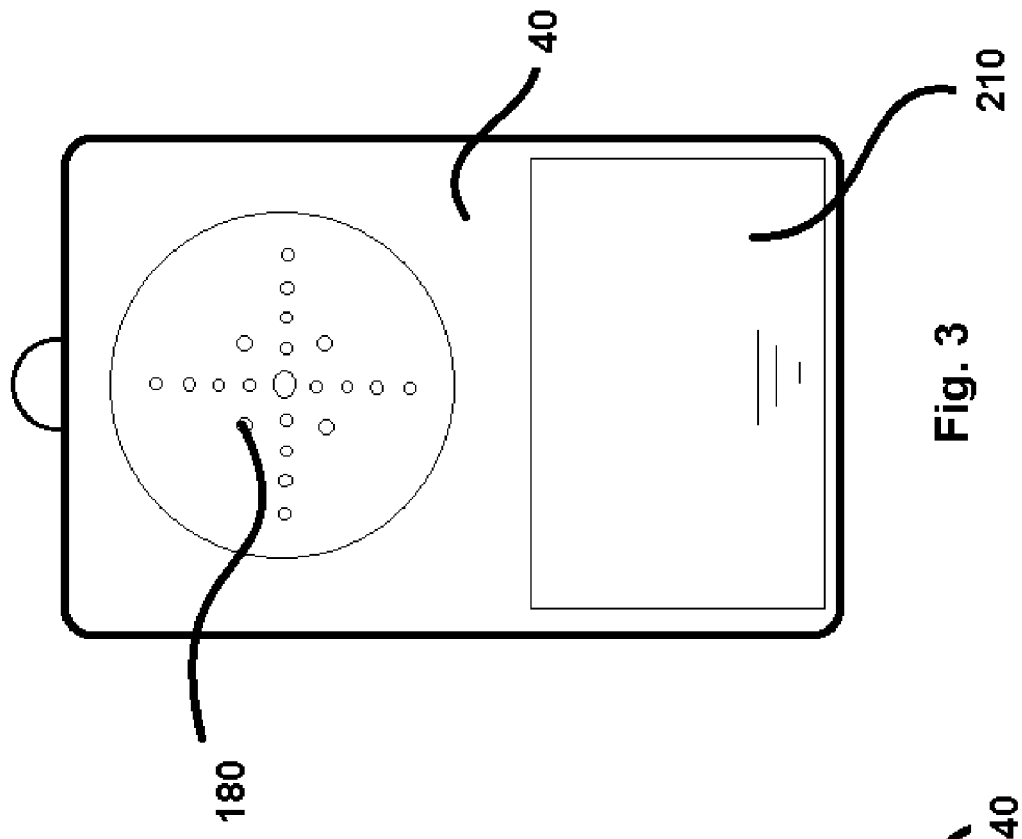
FIG. 3 displays a view of the key fob of the present invention as seen from the rear.
Figure 2:
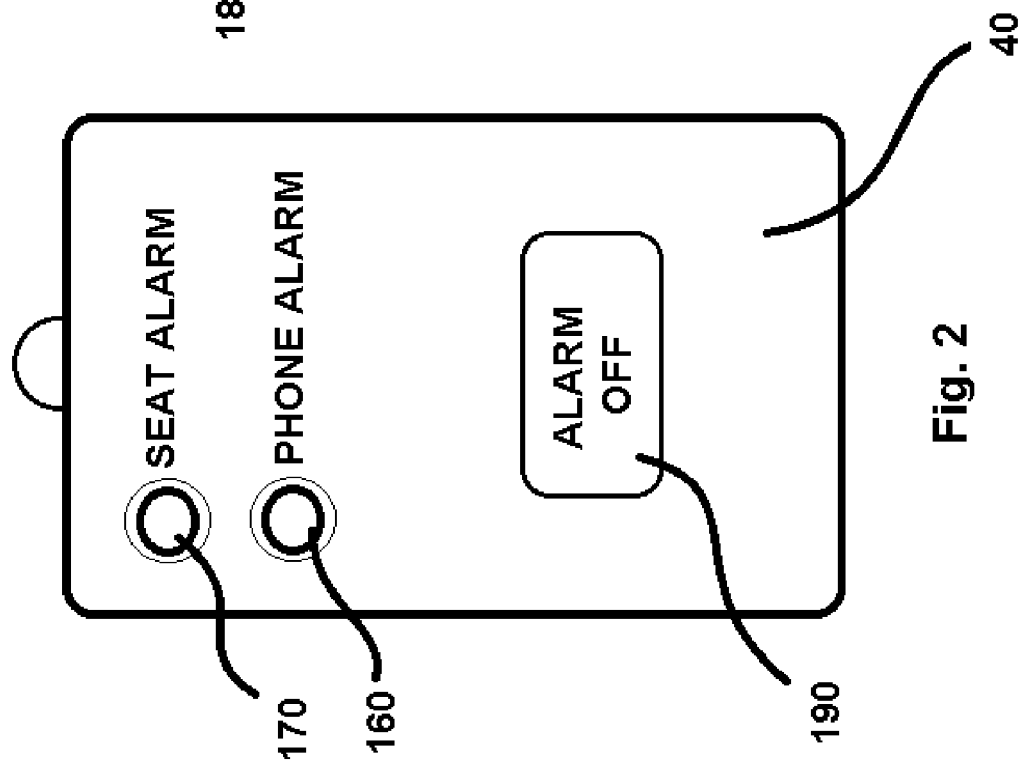
FIG. 2 exhibits a front view of the key fob of the system of the present invention.

It is envisioned that the sensors (10) of the present invention preferably include a first weight sensor disposed within the right-bottom portion of the child seat cushion, and a second weight sensor disposed within the left-bottom portion of the child seat cushion or other car seat cushion, as shown in FIG. 1. The third sensor (10) shown disposed at the rear center of the cushion is optional, and is preferably only integrated in alternate embodiments of the present invention. An ignition detection sensor is preferably also employed by the system of the present invention and is configured to detect when the key is removed from the ignition. The sensors (10) relay data to a central controller (30), which is preferably integrated into the car seat (20) or into a third-party addition that is configured to integrate with the original car seat of the vehicle.

The system of the present invention includes a key fob (40) that wirelessly interfaces with the central controller (30) of the present invention. The key fob (40) is configured to alert the parent or guardian with an audio/visual signal. The audio/visual signal may also alert the parent or guardian via a mobile device application (60) installed on the user's mobile phone or similar mobile device. The present invention is envisioned to interface with the mobile device application (60) via the Bluetooth radio of the mobile device. As such, the system of the present invention is also preferably equipped with a Bluetooth transmitter (50) configured to interface with the mobile device and/or the key fob (40) on the parent or guardian's person.

It is envisioned that a specified period of time must elapse after the keys are removed from the vehicle ignition. The specified period of time may be user-adjustable in some embodiments of the present invention. In the primary embodiment of the present invention, when the sensors (10) continue to detect the presence of a dependent in the car seat (20), the specified period of time which must elapse prior to triggering the alarm is preferably around five minutes, however this setting is preferably adjustable. Ideal settings preferably available on most instantiations of the present invention range from five minutes to ten minutes.

Additionally, the system of the present invention is preferably equipped with an intelligent information sticker (70) which is configured to adhere to or within the window of the vehicle. The intelligent information sticker (70) is additionally equipped with an indicator light (120) to indicate when the device is functioning properly and armed. The intelligent information sticker (70) is preferably equipped with a rechargeable battery (80), at least one solar cell (90), a speaker (100), and at least one LED bulb (110). The intelligent information sticker (70) preferably houses the central controller (30), and is configured to interface with the sensors (10) of the car seat (20), as well as the key fob (40). In the event that the dependent is left behind within the vehicle equipped with the system of the present invention, the alert is triggered after a specified period of time elapses, sending an audio/visual alert to the parent or guardian, while simultaneously the at least one LED bulb (110) begins to light up and flash on the intelligent information sticker (70), and the speaker (100) plays a song or chime in an attempt to entertain and appease the dependent until the parent or guardian returns. With the use of the speaker (100) and the at least one LED bulb (110), patterns and shapes (140) may be illuminated in sequence on the inner surface of the sticker, facing the car seat (20).

Alternate embodiments of the present invention may be configured to separately alert the parent or guardian via the key fob (40) if the parent or guardian accidentally leaves the mobile device within the vehicle, a separate alert ring on the key fob (40), informing the parent or guardian that he forgot his or her mobile device. A phone alarm indicator light (160) is configured to light on the key fob (40) to indicate that the connected device or phone is no longer in range. A seat alarm indicator light (170) is configured to light when the primary alarm of the present invention is sounded. A second speaker (180), located on the rear of the key fob (40) is configured to sound an audible alarm when the present invention is triggered. An 'alarm off' button (190) is preferably disposed on the front of the key fob (40), and should be pressed when the parent or guardian acknowledges the alarm, and begins to return to the vehicle to retrieve the forgotten dependent. The key fob (40) is preferably equipped with a conventional removable battery, which is preferably concealed behind a battery door (210) on the rear of the key fob (40).

Similarly, it is envisioned that the present invention preferably includes additional sensors (20) configured to be implemented into the vehicle's existing rear car seats, so as to ensure the functionality of the present invention whether an infant, booster, or similar child car seat is used, or omitted from use due to haste, such as events where the child car seat is forgotten or left behind at home or work.

In the event that all methods of alarm fail to reach the parent or guardian, the present invention remains triggered until the alarm is manually acknowledged and deactivated in person via a button disposed on the intelligent information sticker (70). If the alarm continues to ring without acknowledgement, either from the mobile device, or in-person, the present invention is preferably equipped to contact a call center and/or emergency services to alert someone to the situation. This time duration is also preferably user-defined, but is preferably set to approximately 30 to 40 minutes.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application. It is envisioned that the apparatus of the present invention is constructed of ecologically-friendly materials.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A child detection alert system apparatus for a car seat of a vehicle comprising:
   at least one sensor, said at least one sensor disposed on the car seat of the vehicle;
   an intelligent interactive information sticker, said intelligent information sticker configured to stick to the interior of a window of the vehicle and display lights and shapes, as well as to play sounds within the vehicle;
   a battery;
   a solar cell, said solar cell in communication with said battery;
   a central controller, said central controller equipped with a CPU;
   a Bluetooth radio;
   an alarm;
   a mobile device application, said mobile device application equipped with said alarm;
   wherein said mobile device application is in communication with said central controller;
   wherein said Bluetooth radio is configured to interface with said mobile device application;
   wherein said at least one sensor is configured to detect proximity of a child within the car seat;
   wherein said intelligent information sticker houses said battery, said solar cell, the indicator light, said Bluetooth radio, and said central controller; and
   wherein said alarm is configured to alert the driver via a mobile device application of an occupant within the car seat after a specified time elapses.

2. The child detection alert system apparatus for a car seat of a vehicle of claim 1, wherein said at least one sensor is configured to detect weight.

3. The child detection alert system apparatus for a car seat of a vehicle of claim 1, further comprising an ignition sensor integrated into the ignition of the vehicle, in communication with said central controller, configured to detect the status of the ignition.

4. The child detection alert system apparatus for a car seat of a vehicle of claim 3, further comprising a key fob;
- wherein said key fob is in communication with said central controller; and
- wherein said key fob is equipped with an audio/visual alert to make the guardian aware of the status of said sensors.

5. The child detection alert system for a car seat of a vehicle of claim 1, further comprising:
- an integrated dashboard control configured to enable and disable the at least one sensor at will; and
- an indicator providing a status of the at least one sensor.

6. A child protection system for a car seat comprising:
- a child detection mechanism, said child detection mechanism configured to detect the presence of a child in the car seat;
- said child detection mechanism disposed within the child car seat;
- a wireless transceiver;
- a remote, said remote equipped with a receiver;
- wherein said wireless transceiver is in communication with said receiver;
- at least one speaker disposed within the remote, said at least one speaker configured to sound an alarm upon detecting the presence of a child after a specified duration of time;
- an ignition sensor, said ignition sensor configured to detect the status of the ignition of a vehicle;
- a central controller;
- wherein said ignition sensor is interfaced with said child detection within the central controller;
- a power supply;
- at least one LED bulb disposed on said remote configured to illuminate when the alarm sounds; and
- an intelligent information sticker configured to light up and play sounds for a child left in the car seat and to remain triggered until said alarm is deactivated in person.

7. The apparatus of claim 6, wherein said remote is integrated into a key fob.

8. The apparatus of claim 6, further comprising:
- a central controller;
- wherein said central controller is equipped with a Bluetooth radio configured to interface with a mobile device;
- wherein said central controller relays the alarm to the mobile device upon sounding the alarm.

9. The apparatus of claim 6, wherein said central controller is configured to be disposed on a window of the vehicle via at least one suction cup.

10. The apparatus of claim 6, further comprising at least one solar panel;
- wherein said at least one solar panel is disposed on said central controller;
- wherein said at least one solar panel is oriented toward the window; and
- wherein said at least one solar panel is in communication with said power source.

* * * * *